(12) United States Patent
Gross et al.

(10) Patent No.: US 8,905,349 B2
(45) Date of Patent: Dec. 9, 2014

(54) STRUCTURAL ELEMENT OF AN AIRCRAFT FUSELAGE

(75) Inventors: Claus-Peter Gross, Buxtehude (DE); Cord Haack, Beckdorf (DE); Dirk Humfeldt, Hamburg (DE); Oliver Thomaschewski, Hamburg (DE)

(73) Assignee: AIRBUS Operations GmbH, Hamburg (DE)

( * ) Notice: Subject to any disclaimer, the term of this patent is extended or adjusted under 35 U.S.C. 154(b) by 884 days.

(21) Appl. No.: 12/595,230

(22) PCT Filed: Apr. 25, 2008

(86) PCT No.: PCT/EP2008/055084
§ 371 (c)(1),
(2), (4) Date: Jun. 18, 2010

(87) PCT Pub. No.: WO2008/132171
PCT Pub. Date: Nov. 6, 2008

(65) Prior Publication Data
US 2010/0243805 A1    Sep. 30, 2010

Related U.S. Application Data

(60) Provisional application No. 60/914,097, filed on Apr. 26, 2007.

(30) Foreign Application Priority Data

Apr. 26, 2007   (DE) .......................... 10 2007 019 821

(51) Int. Cl.
*B64C 1/06*    (2006.01)
*B64C 1/40*    (2006.01)

(52) U.S. Cl.
CPC ................. *B64C 1/064* (2013.01); *Y02T 50/46* (2013.01); *B64C 1/40* (2013.01)
USPC ............................................. 244/119; 244/131

(58) Field of Classification Search
USPC ................... 244/119, 120, 117 R, 118.1, 131
See application file for complete search history.

(56) References Cited

U.S. PATENT DOCUMENTS 2,382,358 A  *  8/1945  Watter .......................... 244/131
2,819,032 A     1/1958  Detrie
(Continued)

FOREIGN PATENT DOCUMENTS

DE          19639339 A1    3/1998
DE          199 55 397 C1   1/2001
(Continued)

OTHER PUBLICATIONS

PCT International Search Report and Written Opinion, PCT Application No. PCT/EP2008/055084, Nov. 5, 2008, 15 pages.

(Continued)

*Primary Examiner* — Brian M O'Hara
(74) *Attorney, Agent, or Firm* — Fenwick & West LLP

(57) ABSTRACT

The structural element of an aircraft fuselage, with stringers running in the longitudinal direction of the aircraft fuselage and ribs running transversely to the stringers in the circumferential direction of the fuselage. According to the invention, at least one of the stringers running in the longitudinal direction of the aircraft fuselage is designed as a fastening rail for elements to be installed in the aircraft fuselage.

14 Claims, 4 Drawing Sheets

(56) References Cited

U.S. PATENT DOCUMENTS

| | | | |
|---|---|---|---|
| 2,945,653 A | 7/1960 | Atkin | |
| 4,310,132 A * | 1/1982 | Frosch et al. | 244/119 |
| 2003/0080251 A1 | 5/2003 | Anast | |
| 2004/0021039 A1 | 2/2004 | Jones | |
| 2005/0005544 A1 | 1/2005 | Borowiecki et al. | |
| 2005/0082431 A1 | 4/2005 | Scown et al. | |
| 2005/0211838 A1 * | 9/2005 | Struve et al. | 244/119 |
| 2005/0211847 A1 | 9/2005 | Pattie et al. | |
| 2006/0060705 A1 * | 3/2006 | Stulc et al. | 244/119 |

FOREIGN PATENT DOCUMENTS

| | | |
|---|---|---|
| DE | 19955397 C1 | 1/2001 |
| DE | 10 2004 035170 B3 | 8/2005 |
| JP | Sho-54-092585 | 7/1979 |
| JP | A-Sho-56-71680 A | 6/1981 |
| JP | A-Sho-60-128097 A | 7/1985 |
| JP | A-Hei-4-14598 | 2/1992 |
| JP | Hei-2-55962 | 2/1992 |
| JP | A-Sho-8-156897 A | 6/1996 |
| JP | A-2007-230036 A | 9/2007 |
| RU | 2143365 C1 | 12/1999 |
| SU | 613947 A1 | 7/1978 |
| SU | 1831595 A3 | 7/1993 |
| WO | WO 02/098734 A1 | 12/2002 |
| WO | WO 2006/007502 A1 | 1/2006 |

OTHER PUBLICATIONS

Russian Decision on Granting the Patent for the Invention, Russian Application No. 2009136665/11(051877), 2012, 5 pages.

Chinese Office Action, Chinese Application No. 200880013652.1, Nov. 30, 2012, 8 pages.

German Office Action, German Application No. 102007019821.5, Dec. 14, 2011, 20 pages.

Japanese Office Action, Japanese Application No. 2010-504711, Sep. 7, 2012, 7 pages.

* cited by examiner

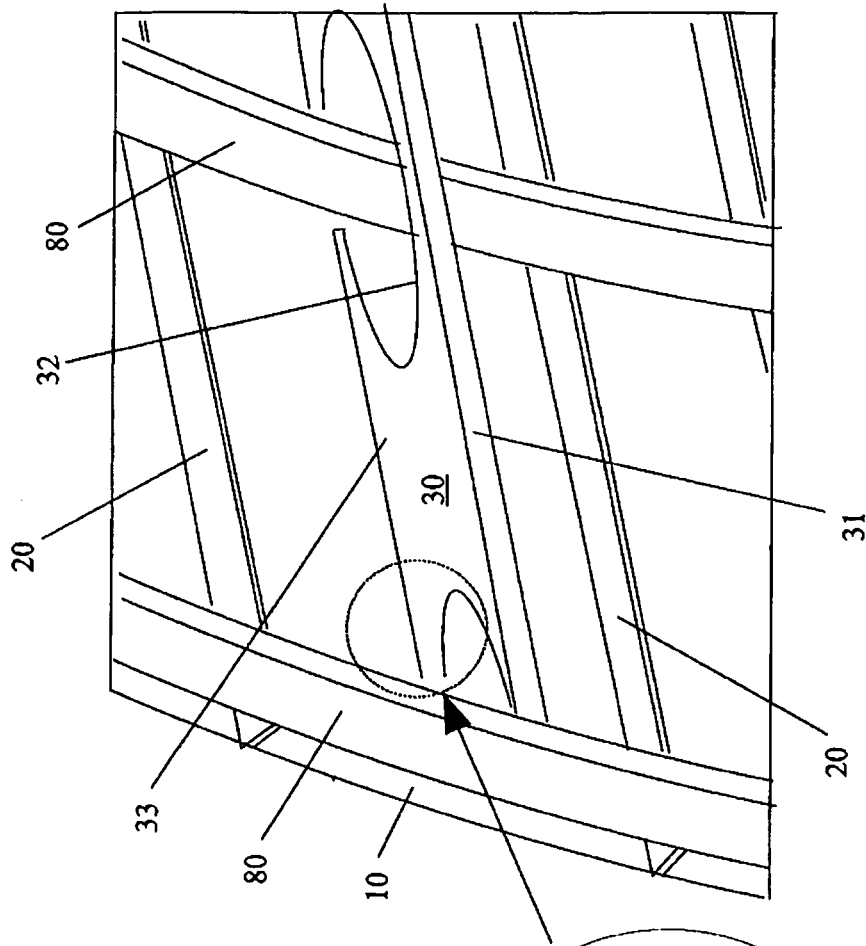
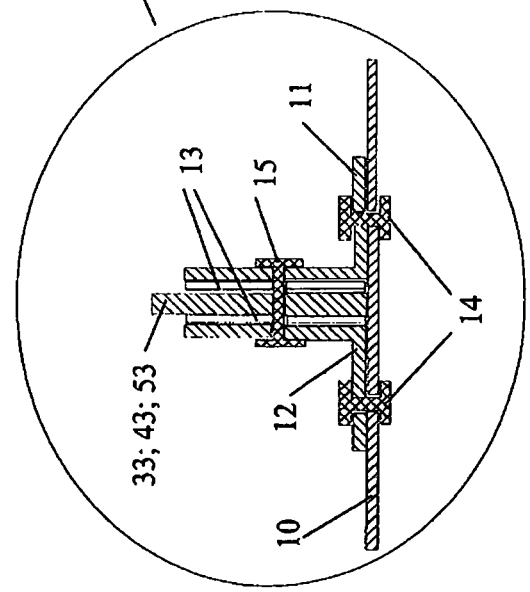
Fig. 2
Fig. 2a)

US 8,905,349 B2

STRUCTURAL ELEMENT OF AN AIRCRAFT FUSELAGE

FIELD OF THE INVENTION

The invention relates to a structural element of an aircraft fuselage according to the preamble of claim 1.

The fuselage of an aircraft typically comprises stringers running in the longitudinal direction of the aircraft fuselage and ribs running transversely to the stringers in the circumferential direction of the fuselage. They impart to the fuselage the required structural strength and support the outer skin of the fuselage. System installations and cabin components which have to be installed during the final assembly of the aircraft in large numbers in the fuselage are normally fastened, according to the present state of the art, by means of individual brackets to the ribs running in the circumferential direction of the fuselage. Components which are most clearly visible to the passenger and which are fastened in the fuselage in this manner include, for example, the luggage bins arranged in the head region of the passenger compartment. The ribs absorb the bearing loads acting on such installations and components. The fastening of components of the said type by means of individual brackets is disadvantageous insofar as the possible fastening points depend on the rib frame, with a correspondingly lower flexibility in terms of positioning, and the assembly cost is high.

DE 199 55 397 C1 discloses a retaining device to be fastened to a stringer of an aircraft cell structure for the mobile or temporary receiving of devices, tools or the like. To ensure that the retaining device can be fastened one-handedly and quickly at different points on a stringer, it comprises a grooved recess adapted to the outer contour of the stringer, into which recess the stringer engages, and an interlocking device which is displaceable in the retaining device against the spring resilience of a compression spring, engages in its interlocking position with a front-side end into the grooved recess, and is retained in an interlocking position by the compression spring.

SUMMARY OF THE INVENTION

The object of the invention is to provide a structural element of an aircraft fuselage in which there is the possibility of high flexibility in assembling installations and components to be fitted in the fuselage independently of the rib frame.

The object is achieved by a structural element of an aircraft fuselage with the features of claim 1.

A structural element of an aircraft fuselage, with stringers running in the longitudinal direction of the aircraft fuselage and ribs running transversely to the stringers in the circumferential direction of the fuselage, is provided by the invention. According to the invention provision is made for at least one of the stringers running in the longitudinal direction of the aircraft fuselage to be designed as fastening rails for elements to be installed in the aircraft fuselage.

An advantage of the structural element according to the invention is that fastening to the stringer is possible with high bearing capacity and simultaneously low weight of the means required for this.

According to a particularly advantageous embodiment of the inventive structural element according to claim 2, provision is made for the structural element to comprise an outer skin of the aircraft fuselage to which the stringers and ribs are connected. One advantage of this is that a load is introduced directly into the outer skin by the stringer, which is designed as a fastening rail for elements to be installed in the aircraft fuselage.

Other advantageous developments and embodiments of the inventive structural element are described in the remaining dependent claims.

BRIEF DESCRIPTION OF THE DRAWINGS

Exemplary embodiments of the inventive structural element are described in the following with reference to the drawing.

FIG. 2 shows a perspective representation of a structural element of an aircraft fuselage in which at least one stringer running in the longitudinal direction of the aircraft fuselage is designed as a fastening rail for elements to be installed in the aircraft fuselage according to an exemplary embodiment of the invention;

FIG. 2a) shows an enlarged sectional cross-sectional representation through a foot region of the stringer shown in FIG. 2, 3 or 4, which is installed on the outer skin according to an exemplary embodiment of the invention in a thermally insulating manner, illustrated here, in particular, with reference to the exemplary embodiment shown in FIG. 2;

DESCRIPTION OF EXEMPLARY EMBODIMENTS

Figure 6:
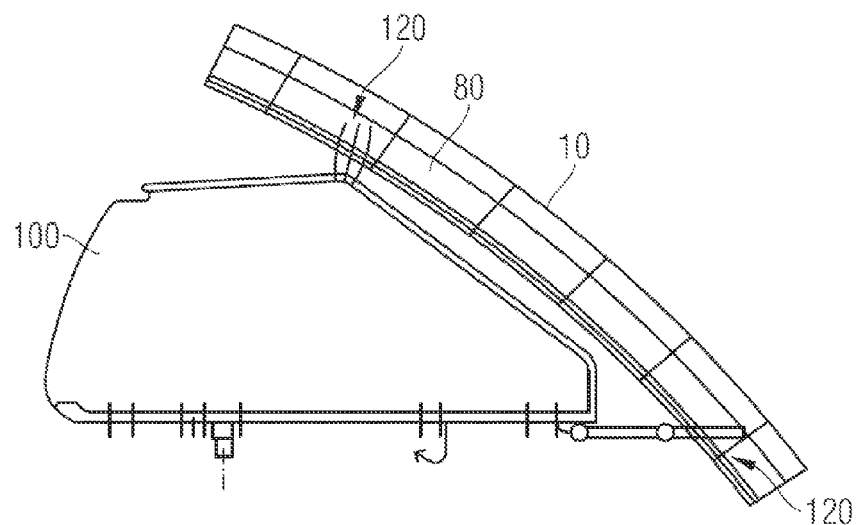
FIG. 6 shows a cross-sectional view of a structural element of an aircraft fuselage in which elements to be installed in the aircraft fuselage are fastened to the ribs by means of brackets according to the state of the art.

FIG. 6 shows, in a cross-sectional view, a structural element of an aircraft fuselage in which elements 100 to be installed in the aircraft fuselage, here as luggage bins arranged in the head region of the passenger compartment, are fastened to ribs 80 running in the circumferential direction of the fuselage by means of individual brackets 120 according to the state of the art. As already explained, fastening of components of the said type by means of individual brackets 120 is disadvantageous, among other things, insofar as there is a dependence of the possible fastening points on the rib frame with correspondingly lower flexibility in relation to the positioning and the assembly cost is high.

Figure 1:
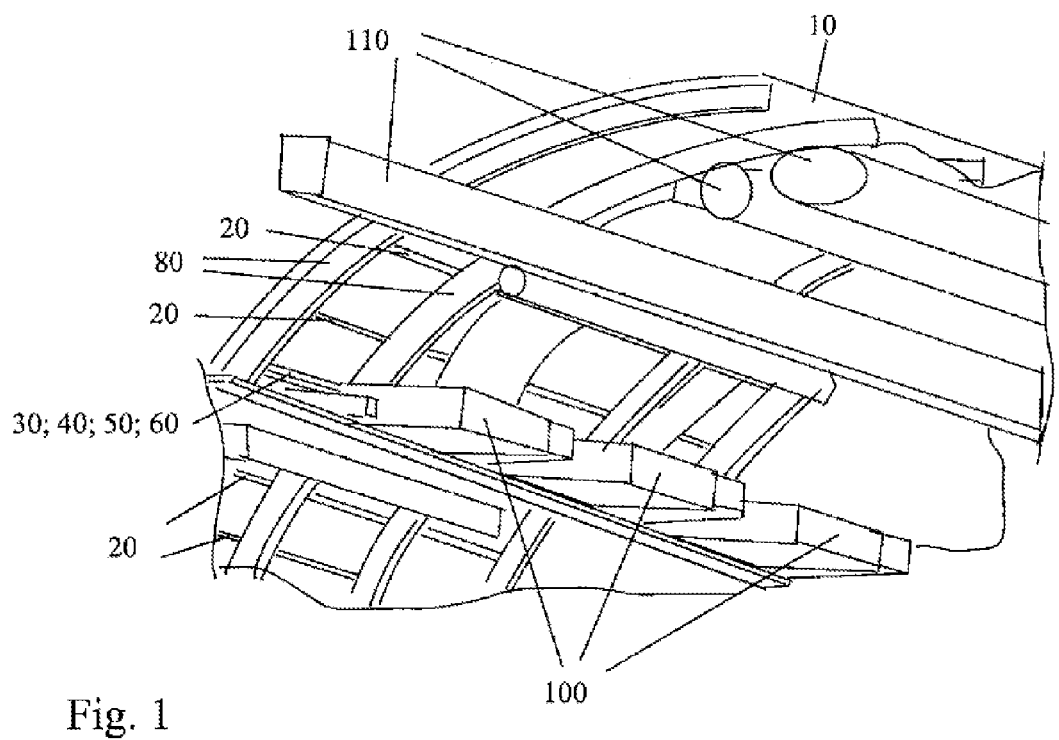
FIG. 1 shows a general perspective representation of a structural element of an aircraft fuselage in which at least one stringer according to the invention, running in the longitudinal direction of the aircraft fuselage, is designed as a fastening rail for elements to be installed in the aircraft fuselage.

FIG. 1 shows a perspective view of a structural element of an aircraft fuselage which comprises stringers 20, 30; 40; 50; 60 running in the longitudinal direction of the aircraft fuselage and ribs 80 running transversely to stringers 20, 30; 40; 50; 60 in the circumferential direction of the fuselage. An outer skin 10 of aircraft fuselage is connected to stringers 20, 30; 40; 50; 60 and ribs 80. Stringers 20, 30; 40; 50; 60 and ribs 80 impart to the fuselage the required structural strength and support outer skin 10.

As shown in the figure, at least one of stringers 30; 40; 50; 60 running in the longitudinal direction of the aircraft fuselage is designed as a fastening rail for elements 100, 110 to be installed in the aircraft fuselage. Such elements 100, 110 to be installed in the aircraft fuselage may be system installations and cabin components, for example luggage bins 100 arranged in the head region of the passenger compartment and other system installations 110 of the functional infrastructure of the aircraft.

Figure 3:
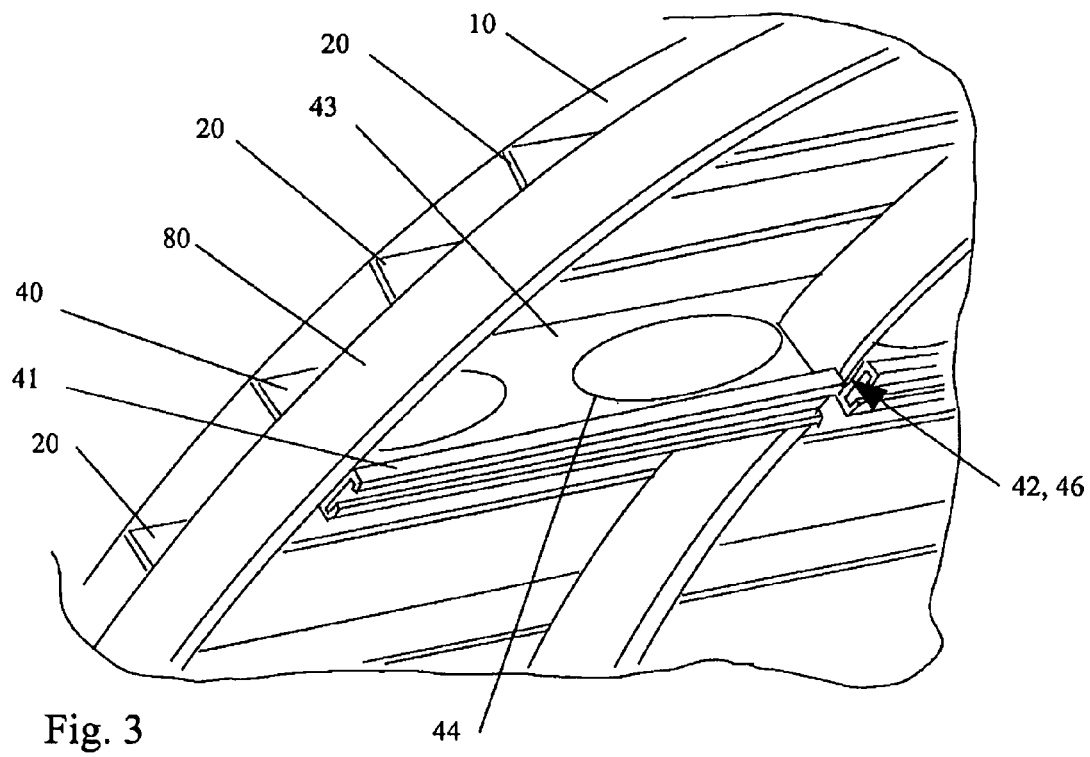
FIGS. 3 to 4 each show a perspective representation of a structural element of an aircraft fuselage in which at least one stringer running in the longitudinal direction of the aircraft fuselage is designed as a fastening rail for elements to be installed in the aircraft fuselage according to two further exemplary embodiments of the invention.
Figure 4:
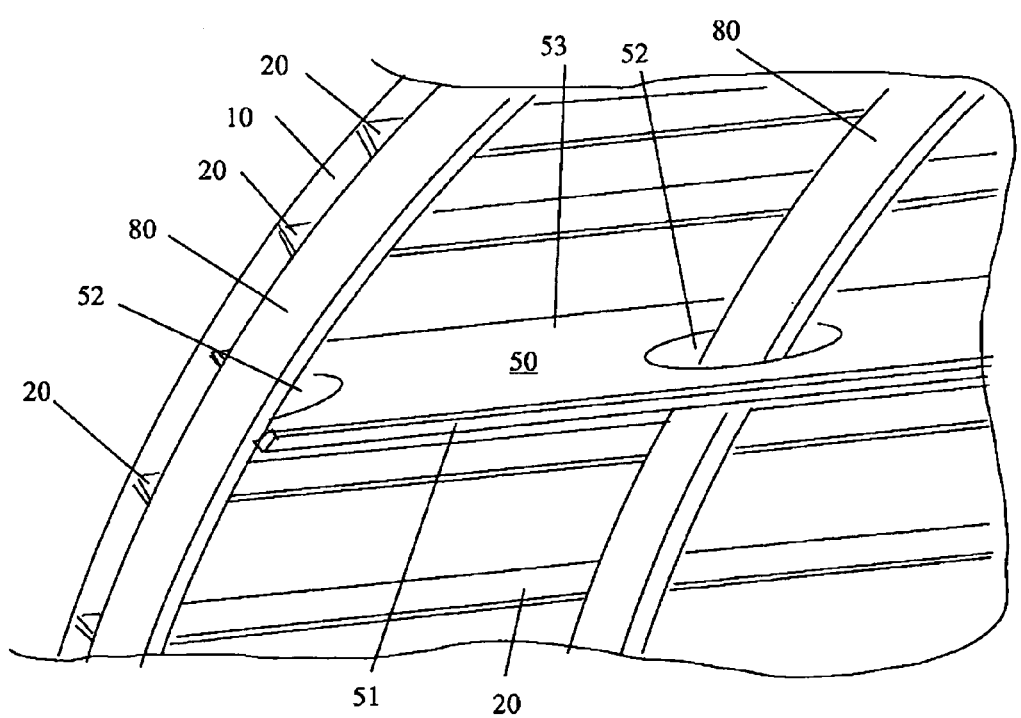

In the exemplary embodiments shown in FIGS. 2 to 4, the stringer 30; 40; 50 designed as a fastening rail comprises an at least in regions continuous head region 31; 41; 51 facing towards the fuselage interior and extending in the longitudinal direction of the stringer. According to the exemplary embodiments shown here, this head region 31; 41; 51 has a profile cross-section which is provided for installing fastening elements. The fastening elements which are not shown separately in the figures and which may be provided in a manner of prior art and which do not constitute the subject matter of this invention, serve to assemble system installations and cabin components which are to be installed in large numbers in the fuselage in the final assembly of the aircraft.

As shown in FIGS. 2 and 4, the profile cross-section of head region 31; 51 may be T-shaped. According to FIG. 3 the profile of head region 41 has a C-shaped profile cross-section, the open segment of the C-shaped profile cross-section facing towards the fuselage interior.

In the exemplary embodiment shown in FIG. 2, stringer 30 designed as a fastening rail has a head region 31 that is continuous longitudinal direction and is provided in the region of ribs 80 with recesses 32 on which stringer 30 is interrupted on its side facing towards outer skin 10 and which enclose ribs 80 on the side facing towards the fuselage interior. This design enables stringer 30 to be installed above ribs 80 after they have been fastened to outer skin 10.

On the other hand, in the exemplary embodiment shown in FIG. 3 stringer 40 designed as a fastening rail has a head region 41 that is continuous in the longitudinal direction of the same between ribs 80 but is interrupted by these receiving recesses 42 on ribs 80. This design enables stringer 40 to be fastened to outer skin 10 together with the other stringers 20, which are conventionally of simple design, and then enables ribs 80 to be installed in the conventional manner. These bridging connecting elements 46 can then be inserted in recesses 42 of head region 41 receiving ribs 80, which elements enclose ribs 80 on the side facing towards the fuselage interior, so that a continuity of head region 41 of stringer 40 is also provided on ribs 80.

In the exemplary embodiment shown in FIG. 4, stringer 50 designed as a fastening rail has a head region 51 that is continuous in the longitudinal direction of the stringer and is provided on ribs 80 with recesses which enclose ribs 80 on all sides. This design enables stringer 50 to be fastened to outer skin 10 together with the other stringers 20, which are designed simply in the conventional manner, and then enables ribs 80 to be installed by threading them into recesses 42.

Figure 5:
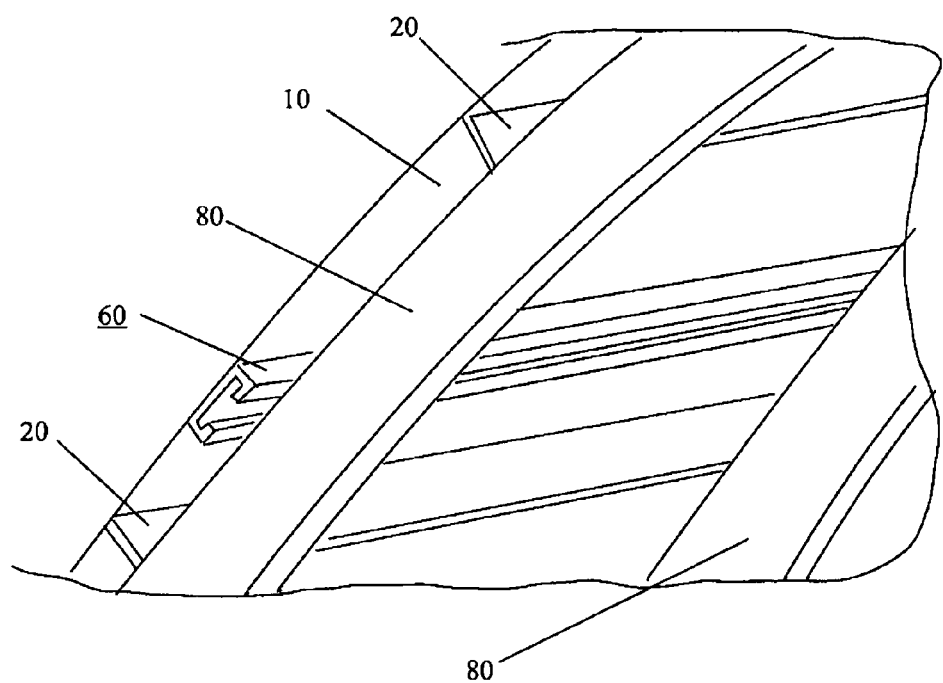
FIG. 5 shows a perspective representation of a structural element of an aircraft fuselage in which at least one stringer running in the longitudinal direction of the aircraft fuselage is designed as a fastening rail for elements to be installed in the aircraft fuselage, according to another exemplary embodiment of the invention.

In the exemplary example shown in FIG. 5, stringer 60, designed as a fastening rail, is produced as such with a profile cross-section which is provided for installing fastening elements. Here stringer 60 has a C-shaped profile cross-section whose open segment faces towards the fuselage interior. This design also enables stringer 60 to be fastened to outer skin 120 in the normal manner together with the other stringers 20, which are simply designed in the conventional manner. Ribs 80 are then installed above it in the conventional manner.

Just as in the exemplary embodiment shown in FIG. 3, stringer 40 serving as a fastening rail can be designed as a perforated rail with holes or sections 44 which serve to save weight and/or for the fastening of components or installations in the cabin.

A design of stringer 40 as a perforated rail may be provided instead of or in addition to a design of a profile 31; 41; 51 used for fastening in its head region.

As the cross-sectional representation enlarged in sections in FIG. 2a) shows, stringer 30; 40; 50 designed as a fastening rail may have a foot region or flange 33; 43; 53 for installing stringer 30; 40; 50 to outer skin 10, which is fastened to the latter in a thermally insulating manner. According to FIG. 2a) the foot region or flange 33; 43; 53 is secured by means of angle profiles 11, 12 and rivets 14, 15 to outer skin 10, where a thermal insulation 13 in the form of a thermally insulating layer extending along foot region 33; 43; 53 is provided between angle profiles 11, 121 and foot region 33; 43; 53.

The structural element with outer skin 109 and stringers 20; 30; 40; 50; 60 running in the longitudinal direction of the aircraft fuselage and ribs 80 running transversely to stringers 20, 30; 40; 50; 60 in the circumferential direction of the fuselage may be produced in a metal design, a fibre reinforced plastic design (CKF) or in a hybrid design combining both.

LIST OF REFERENCE NUMERALS

10 Structural element
11, 12 Angle profile
13 Insulation
14 Rivet
15 Rivet
20 Stringer
30; 40; 50; 60 Stringers
31; 41; 51 Head region
32; 42; 52 Recess
33; 43; 53 Foot region, flange
44 Hole, recess
46 Sealing element
80 Rib
100 Luggage bin
110 Installations
120 Bracket

The invention claimed is:

1. A structural element of an aircraft fuselage, comprising:
stringers extending in a longitudinal direction of the aircraft fuselage; and
ribs extending transversely to the stringers in a circumferential direction of the fuselage,
wherein at least one of the stringers includes at least a one-piece stringer portion formed as a fastening rail for elements to be installed in the aircraft fuselage, the one-piece stringer portion comprising:
a head region that extends in the longitudinal direction, the head region being interrupted by receiving recesses that receive said ribs and are open on a side facing towards an interior of the fuselage, the head region being continuous between the receiving recesses; and
a foot region opposite the head region that extends in the longitudinal direction continuously between ends of the one-piece stringer portion and is uninterrupted by the receiving recesses,
wherein the one-piece stringer portion is perforated with a plurality of holes configured for fastening components.

2. The structural element according to claim 1, wherein the structural element comprises an outer skin of the aircraft fuselage, wherein the stringers and ribs are connected to the outer skin.

3. The structural element according to claim 2, wherein the foot region is fastened to the outer skin; and
wherein the head region faces towards the interior of the fuselage.

4. The structural element according to claim 3, wherein the head region has a profile cross-section provided for positive installation of fastening elements.

5. The structural element according to claim 4, wherein the profile cross-section of the head region is L-shaped.

6. The structural element according to claim 4, wherein the profile cross-section of the head region is T-shaped.

7. The structural element according to claim 4, wherein the profile of the head region has a C-shaped profile cross-section.

8. The structural element according to claim 7, wherein an open segment of the C-shaped profile cross-section faces towards the interior of the fuselage.

9. The structural element according to claim 3, wherein the one-piece stringer portion is fastened in a thermally insulating manner to the outer skin.

10. The structural element according to claim 9, wherein the foot region is fastened by means of angle profiles to the outer skin, wherein a thermal insulation is provided between the angle profiles and the foot region.

11. The structural element according to claim 1 wherein bridging sealing elements are inserted into the recesses of the head region, wherein the bridging sealing elements enclose the ribs on a side of the ribs facing towards the interior of the fuselage.

12. The structural element according to claim 1, wherein the one-piece stringer portion formed as a fastening rail has a profile cross-section which is used for positive installation of fastening elements.

13. The structural element according to claim 12, wherein the one-piece stringer has a C-shaped profile cross-section whose open segment faces towards the interior of the fuselage.

14. The structural element according to claim 1, wherein the plurality of holes are located in a region of the one-piece stringer portion between the head region and the foot region.

* * * * *